United States Patent [19]

Schimmer et al.

[11] 3,800,408

[45] Apr. 2, 1974

[54] METHOD OF FORMING A SOLDERING JIG FROM POLYIMIDE PLASTIC

[75] Inventors: Rigobert Schimmer; Horst Gesing, both of Belecke; Wolfgang Beerwerth, Neheim-Husten; Jurgen Messerschmidt, Belecke, all of Germany

[73] Assignee: Licentia Patent-Verwaltungs GmbH, Frankfurt, Germany

[22] Filed: June 29, 1971

[21] Appl. No.: 157,854

Related U.S. Application Data

[63] Continuation-in-part of Ser. No. 62,994, Aug. 11, 1970, abandoned.

[30] Foreign Application Priority Data

Aug. 11, 1969   Germany............................ 1940769

[52] U.S. Cl..................... 29/493, 228/56, 269/286, 269/321 WE
[51] Int. Cl......................... B23k 5/22, B23k 31/02
[58] Field of Search ............ 269/285, 286, 321 WE; 228/56, 57; 29/493

[56] References Cited

UNITED STATES PATENTS

| 3,087,450 | 4/1963 | Crocker............................ 29/493 X |
| 3,119,116 | 1/1964 | Ashworth......................... 269/286 X |
| 3,221,970 | 12/1965 | Lockshin ............................... 228/56 |
| 3,451,609 | 6/1969 | Gillett.................................... 228/56 |
| 3,459,419 | 8/1969 | Lillie................................ 269/286 X |
| 3,516,155 | 6/1970 | Smith.............................. 228/56 X |
| 3,525,799 | 8/1970 | Ellis ................................. 228/56 X |
| 3,583,556 | 6/1971 | Wagner....................... 269/286 UX |

OTHER PUBLICATIONS

"Vespel Precision Parts from DuPont Polyimide Resins," 1967, 12 pages, Scientific Library

*Primary Examiner*—J. Spencer Overholser
*Assistant Examiner*—Ronald J. Shore
*Attorney, Agent, or Firm*—Spencer & Kaye

[57] ABSTRACT

A method of soldering using a polyimide plastic jig where two parts to be joined are located in the jig and are soldered while in the jig.

2 Claims, 3 Drawing Figures

PATENTED APR 2 1974 3,800,408

INVENTORS.
Rigobert Schimmer
Horst Gesing
Wolfgang Beerwerth
Jürgen Messerschmidt BY Spencer & Kaye
ATTORNEYS.

METHOD OF FORMING A SOLDERING JIG FROM POLYIMIDE PLASTIC

CROSS-REFERENCE TO RELATED APPLICATION

The present application is a continuation-in-part application of copending U.S. Pat. application Ser. No. 62,994, filed Aug. 11th, 1970, by the same inventors for a "Jig." Application Ser. No. 62,994 was abandoned subsequent to the filing of the present application.

BACKGROUND OF THE INVENTION

The present invention relates to a soldering jig.

Soldering jigs are used in many areas of technology when it is desired to solder two or more parts together with very accurate placement of one part relative to another. Such soldering jigs are often used when the soldering of the parts is to be accomplished in a furnace, for example in those types of furnaces which surround a conveyor system on which the parts are continually moving. The soldering jigs hold the parts to be joined in desired relative positions until solidified solder can hold the parts rigidly together.

When high demands on the accuracy of the soldering is necessary, such as is the case in certain electrical applications, for instance semiconductor technology, the soldering jigs must themselves satisfy high requirements for dimensional accuracy and stability. Such soldering jigs can only be made of materials which suffer no ill effects at the temperature of the molten solder and which do not react with the melt. Neither should there be reactions of the solder with the material of the soldering jig, nor should there be a destruction of the soldering jig by reactions between solder and soldering jig at the requisite soldering temperatures and the usually strongly reducing conditions in the soldering furnace. Additionally, a semiconductor soldering jig must not have a negative influence on the electrical properties of the semi-conductor elements. For instance, it must not cause instability in blocking ability, such as movement and very high reverse currents in the voltage-current curve of a blocking characteristic.

It is known to make soldering jigs of carbon, metals and ceramics. The use of these materials, however, gives rise to certain disadvantages.

Soldering jigs of carbon do not maintain their dimensions over extended periods of use, because the carbon tends to chip. Especially in complex soldering jigs, this chipping can lead to loss of accurate holding of the parts to be soldered together and thus to unusable end products. This problem is especially critical in semiconductor technology.

Soldering jigs of metal are expensive to manufacture and this problem is especially critical where many jigs are necessary. Each jig must be separately worked by boring, turning, milling or grinding processes. Metal soldering jigs can also damage the parts to be soldered together, especially when the parts are of delicate construction. Thus, the applicability of soldering jigs of metal is considerably limited.

Inexpensive soldering jigs of ceramic materials, when unglazed, have the disadvantage of comparatively rough surface. Moreover, such jigs can be difficult to produce, because the shrinkage during firing can not be accurately predicted. Application of glaze further worsens the problem of obtaining accurate jig dimensions. It is also extremely difficult to adjust the dimensions of a fired ceramic jig.

SUMMARY OF THE INVENTION

An object of the present invention, therefore, is to provide a soldering jig which does not have the above-noted disadvantages of jigs made of carbon, metal or ceramic, which is easily and economically producible, even in large quantities, which maintains its dimensional accuracy over long periods of usage, which has a smooth surface, and which does not chip during use.

This as well as other objects which will become apparent in the discussion that follows are achieved according to the present invention by a soldering jig made of a plastic resistant to high temperatures and reducing conditions.

DESCRIPTION OF THE PREFERRED EMBODIMENTS

Since suitable heat-resistant plastics, for example the polyimides, are relatively expensive, it is preferred to combine the jig of the invention with structures of less expensive materials where possible. Thus, when the jig of the present invention is being used for the soldering of semiconductor components, it is preferred to make only the receptacle for the semiconductor wafer of heat-resistant plastic, for example polyimide. The support for the polyimide jig may be made of a less expensive material, for example nickel-plated steel.

Figure 1:
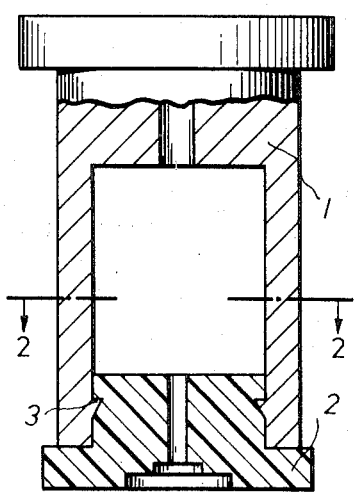
FIG. 1 is an elevational section including a jig according to the invention, viewed from the line 1—1 of FIG. 2.
Figure 2:
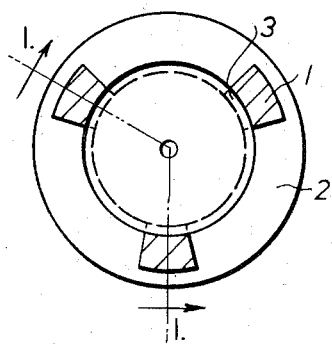
FIG. 2 is a sectional view from the line 2—2 of FIG. 1.

Thus, referring to FIGS. 1 and 2, generally cylindrical, nickel-plated steel support 1 has arms with protrusions 3 which bear against the jig 2 of high-temperature resistant plastic to grip it and hold it in assembly. Jig 2 is made, for example, of polyimide.

The bearing force of protrusions 3 against jig 2 is a result of the three arms of support 1 being forced to deflect elastically outwards when the upper cylindrical section of jig 2 is pushed upwardly into the assembled position of FIG. 1. As is well known, steel has an elastic modulus of around $30 \times 10^6$ psi/inch/inch, where psi represents pounds per square inch; thus the arms can be designed to give a suitable bearing force for holding jig 2 in assembly under any given conditions. The angle at the tip of protrusions 3, as shown in FIG. 1, may be 45°; this provides for easy assembly and secure holding.

Figure 3:
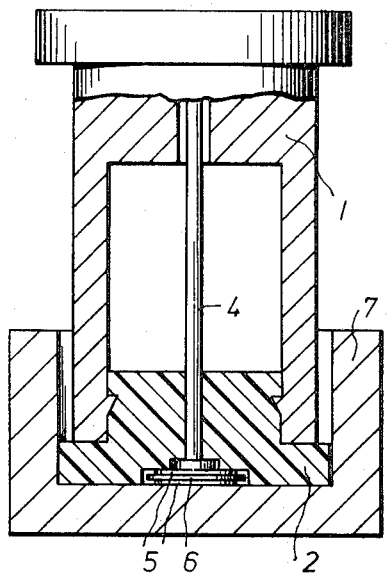
FIG. 3 is a view as in FIG. 1 of a jig being used for a soldering operation.

Referring now to FIG. 3, the assembly of jig and support of FIGS. 1 and 2 is being used for soldering together a semiconductor wafer 6, an electrical current lead 4, and a cup-shaped housing 7. Discs 5 of solder are shown in place. Jig 2 centers the semiconductor wafer 6 relative to the internal diameter of housing 7 using the inner diameter of its wafer receptacle. Additionally, lead 4 is centered relative to the wafer. The entire unit, with solder discs 5, is placed in a soldering furnace for yielding an assembly of lead 4, wafer 6, and housing 7.

As is apparent from FIG. 3, support 1 functions as a handle for the insertion of jig 2 into housing 7 and for its subsequent removal after soldering. Support 1 additionally functions to maintain lead 4 in a position extending vertically upwards from wafer 6; thus the weight of the lead is made to bias the unsoldered sequence, solder-wafer-solder, against the floor of housing 7; additionally, natural flexure of lead 4 is prevented, thus eliminating the possibility of the tipping-over of the entire unit in the soldering furnace.

When making soldering jigs according to the invention, for example, by casting or compression methods, it is generally not necessary to subject the jigs to a subsequent dimensional finishing process, because the plastic surface has a natural surface smoothness and dimensional accuracy. Thus, the soldering jigs according to the present invention are advantageously different from soldering jigs of carbon, metal, and ceramic. A reaction between the molten solder and the plastic which comprises the soldering jig according to the present invention does not occur.

The plastic materials used for making the soldering jigs of the present invention do not show the disadvantages listed above for carbon, metals and ceramics. It is very easy to make test jigs and small quantities of jigs by working the plastic with conventional mechanical methods such as turning. Soldering jigs made according to the present invention do not damage delicate surfaces. The jigs themselves do not, for all practical purposes, undergo dimensional changes during extended use. Mass production of soldering jigs according to the present invention can be made by compression or casting methods. Either of these methods makes it possible to obtain jigs having excellent surface smoothness and dimensional accuracy at low price.

Especially suited as the plastic material for soldering jigs according to the present invention are the polyimides. Among these, a semi-finished part sold under the name "Vespel" has been used with success. Vespel may be obtained from DuPont de Nemours International S.A.; 81, Route de l'Aire; Geneva, Switzerland. Among the Vespels, it is preferred to use Vespel SP-1.

Another suitable polyimide is, for example, polyimide molding material M 33, a product of Societe des Usines Chimiques, Rhone - Poulenc; 22, Avenue Montaigne; Paris 8, France.

The term polyimide designates a class of chemical compounds in which one nitrogen atom is bonded to two carbonyl groups in a cyclic system according to the following structural formula, where the indicated bonds between the nitrogen atom and the carbon atoms of the carbonyl groups are termed imide bonds:

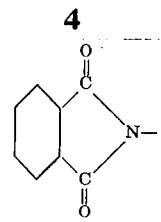

The polyimides are obtained by condensation reactions of aromatic tetracarboxylic acids, for example pyromellitic acid, or their anhydrides, for example pyromellitic dianhydride, with aromatic diamines, for example 4,4'-diamino-diphenyl ether. Following condensation, polymers of the following general type are obtained:

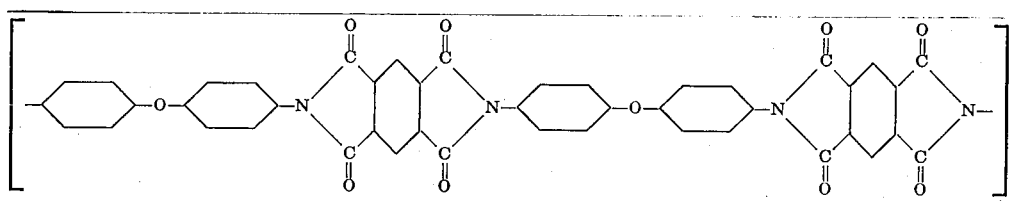

The density of polyimides is from 1.3 to 1.7 grams per cubic centimeter. They can undergo long-term loading at temperatures up to 350° C and, when used for shorter periods of time, can be loaded at temperatures up to 500° C. Their ability to withstand reducing conditions is evident in that they are resistant, for all practical purposes, to treatment at 300° C, one atmosphere pressure, in an atmosphere composed of 20% hydrogen and 80% nitrogen; their weight loss after 100 soldering cycles each having a 30 minute length is below 1%.

Among other classes of the polyimides are, for example, the polyamide-imides. These are copolymers, which contain imide and amide groups. These copolymers are, however, less heat-resistant.

The following soft solders have been used successfully to join parts held in polyimide soldering jigs according to the present invention: lead-tin, lead-indium, lead-indium-silver. The preferred solder contains 70 weight-% lead and 30 weight-% indium. Soldering can be effected with and without flux. A suitable flux is colophony (abietic acid). Soldering temperature for the preferred solder is 320° C. The soldering is carried out in a forming gas atmosphere of 20% hydrogen and 80% nitrogen.

To make the jigs of the present invention by compression molding, for example pre-condensed polyimide molding material in powdered form, for instance M 33, Type A and Type B of the Societe des Usines Chimiques, Rhone - Poulenc, possessing a bulk density of about 0.5 g/cm³, is suitable. Type A is used for molding with unfilled resin or with a filler fraction less than 40 weight-%, while Type B is used when the filler fraction is from 40 to 80 weight-percent. Suitable fillers are, for example, silica powder, glass fiber dust, mica, and rock dust. Molding pressures are between 50 and 400 kiloponds/cm², molding temperatures between 230° and 300°C, and molding time about 10 minutes. Shrinkage of a molding material without fillers is about 1 percent, while with a material containing fillers the shrinkage is less than 1 percent.

After molding, the jigs are subjected to an after-bake process involving heating for 24 hours at 250°C or short heat-shocks of about 10 to 15 minutes at temperatures around 300°C. During this after-bake process there is an additional small shrinkage of about 0.1 percent.

Steel is a suitable material for the molds used for molding. The inner surfaces of the mold are polished and preferably chrome-plated.

Polyimide molding material M 33 contains no volatile components.

In casting methods, the polyimide is cast before polycondensation. A casting and mold temperature of 50°–300°C is used. Curing is carried out at 200°–400° C. A shrinkage of about 1 percent occurs.

When soldering semiconductor components designed for high blocking voltages, for example thyristors, using soldering jigs of polyimide, especially jigs made from the intermediate resin Vespel, it has been found that the resulting components exhibit instability in their blocking behavior, if the soldering jig is not given a special preliminary treatment. These negative influences are especially noticeable when a soldering jig has been stored for a considerable time in air; this is probably due to moisture which is collected by the polyimide. At equilibrium at 50 percent relative humidity, the polyimide "Vespel SP 1" has a moisture content amounting to 1.0 to 1.3 percent by weight. Such water contents can actually arise under normal manufacturing conditions; for example, equilibrium may be reached when the jig is stored overnight or when a jig is not under continuous use. Even after a storage of just several hours, significant instabilities in blocking behavior can be noticed, such as movement of the characteristic, and high reverse currents. Since a constant, high quality and high production yield is very important for semiconductor components, these negative influences are extremely disturbing. Consequently, soldering jigs of polyimide, especially of the polyimide Vespel, must be subjected to special treatment before and during production runs. The following treatments have been found to overcome this problem of instability.

When using a flux, such as colophony, and complex soldering jigs, such as are used in the semiconductor technology, a cleaning of the soldering jigs is necessary after a soldering. A combined trichloroethylene and isopropanol cleaning has proven to give excellent results.

This cleaning is initiated with a 2 to 3 minute placement of the jig in vaporous trichloroethylene, followed by an ultrasonic cleaning in hot trichloroethylene. Then the jig is again placed in the vaporous trichloroethylene for 2 to 3 minutes. Finally, the jig is treated in cold isopropanol for a further ultrasonic cleaning.

The cleaning is followed by a heating of the jig in a drying chamber under a nitrogen atmosphere with a flow-through rate of 300 standard liters of nitrogen per hour. The temperature and pressure for the standard liter are 0° centigrade and 760 mm Hg. The heating begins with a 90 minute heating of the jig to 280°C, maximum 290°C. Subsequently, the jig is cooled to 120°C, minimum 100°C, in 3 hours. The nitrogen must flow during the entire heating and subsequent cooling. This heating program does not disturb normal production, since the heating and cooling may be done in the course of a night. The program must be controlled such that the next soldering process begins right at the time when the jig temperature has sunk to 120°C. Jigs treated in this manner exercise no negative influences on the blocking behavior of soldered semiconductor elements.

Preferably, a jig is kept continually in use, since as above mentioned a storage of only several hours in air leads to significant instabilities in the blocking behavior of semi-conductor elements.

The ultrasonic cleaning apparatus used for the above-described cleaning treatments in trichloroethylene and isopropanol emits sound vibrations having a frequency of 25,000 cycles/second and an intensity of power level of 0,67 watts/cm$^2$. The dimensions of its tank for receiving a jig and the appropriate cleaning liquid are 20 cm long, 20 cm wide, and 25 cm high. This particular apparatus is supplied under the trademark Branson, Europa, N.W., model number Type A 150 GE-1264, by Branson, Soest, Energieweg 2, Netherlands. Exemplary parameters for the above-described cleaning and heating process are as follows: temperature and pressure of the vaporous trichloroethylene equal 87,2°C and 760 mm Hg, respectively; temperature of the hot trichloroethylene equals 55°C; temperature of the cold isopropanol equals 25°C; and dimensions of the drying chamber equal 95 cm long, 80 cm wide, and 60 cm high.

Exemplary parameters for making a jig as illustrated in the drawings and having a maximum outer diameter of 2 centimeters are as follows: Molding material M 33, Type A, mixed with 20 weight-percent silica powder as based on the total weight of the mixture; molding pressure of 200 kiloponds/cm$^2$; molding temperature of 250°C; molding time equals 10 minutes; after-bake process of 24 hours at 250°C.

It will be understood that the above description of the present invention is susceptible to various modifications, changes and adaptations, and the same are intended to be comprehended within the meaning and range of equivalents of the appended claims.

We claim:

1. The method of soldering using a polyimide plastic jig comprising the steps of forming a soldering jig from polyimide plastic, locating in the jig two parts to be joined, and soldering the two parts together while located in the jig.

2. A method as claimed in claim 1, wherein the steps of soldering is effected in a furnace.

* * * * *